Dec. 31, 1929.  C. R. KELTY  1,741,721
MOTOR CONTROLLING DEVICE
Filed Dec. 14, 1925   3 Sheets-Sheet 1

Inventor:
Charles R. Kelty,
by Emery, Booth, Janney & Varney
Attys.

Dec. 31, 1929.  C. R. KELTY  1,741,721
MOTOR CONTROLLING DEVICE
Filed Dec. 14, 1925   3 Sheets-Sheet 2
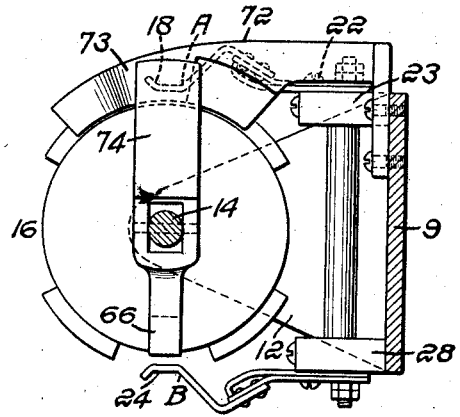
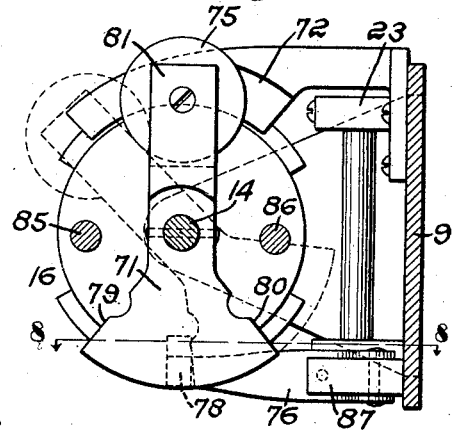
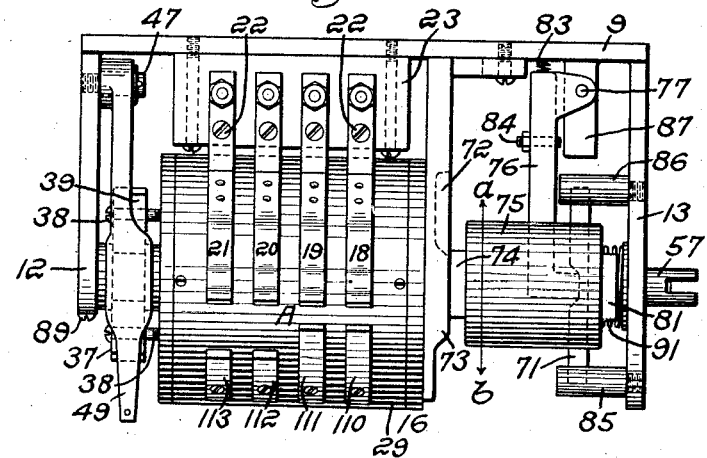
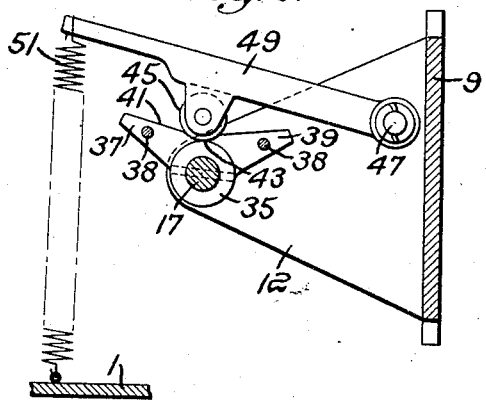
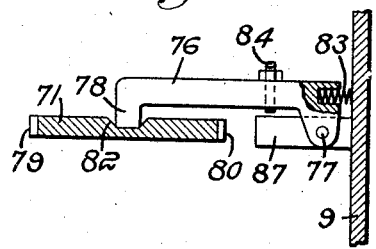
Inventor:
Charles R. Kelty,
by Emery, Booth, Janney & Varney,
Attys.

Dec. 31, 1929.     C. R. KELTY     1,741,721
MOTOR CONTROLLING DEVICE
Filed Dec. 14, 1925     3 Sheets-Sheet 3

CENTRIFUGAL SWITCH

Inventor:
Charles R. Kelty
by Emery, Booth, Janney & Varney,
Attys.

Patented Dec. 31, 1929

1,741,721

UNITED STATES PATENT OFFICE

CHARLES R. KELTY, OF MILTON, MASSACHUSETTS

MOTOR-CONTROLLING DEVICE

Application filed December 14, 1925. Serial No. 75,174.

This invention aims to provide an efficient and reliable controlling device for motors and more particularly for reversible electric motor.

In the accompanying drawings wherein is shown merely for illustrative purposes one embodiment of my invention:

Fig. 4 is a transverse section through the switch taken approximately on the line 4—4 of Fig. 3;

Fig. 5 is also a transverse section through the switch taken approximately on the line 5—5 of Fig. 3;

Fig. 6 is a detail plan view of the switch mechanism;

Fig. 7 is a detail section through the switch mechanism taken on the line 7—7 of Fig. 3 and illustrating the means for retaining the movable switch member in neutral or switch open position;

Fig. 8 is a horizontal section taken on line 8—8 of Fig. 5 showing in detail means for holding the switch actuator in its several positions;

Figure 13:
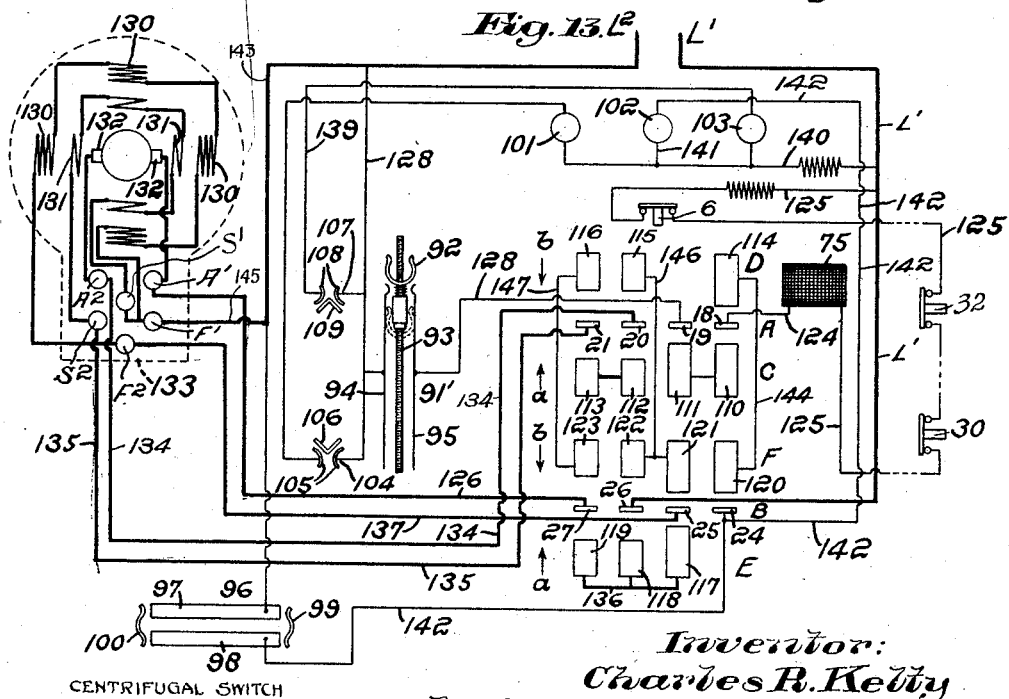

Figs. 9 to 12 inclusive are diagrammatical views showing the relation of the contacts of the various series carried by one of the switch members to the cooperating contacts of the other switch member; and Fig. 13 is a wiring diagram for the motor controlling device.

The motor controlling device of the present invention is obviously capable of a variety of uses, but is primarily intended as an improvement over the motor controlling device disclosed in my copending application Serial No. 19,183, filed March 28, 1925.

Figure 1:
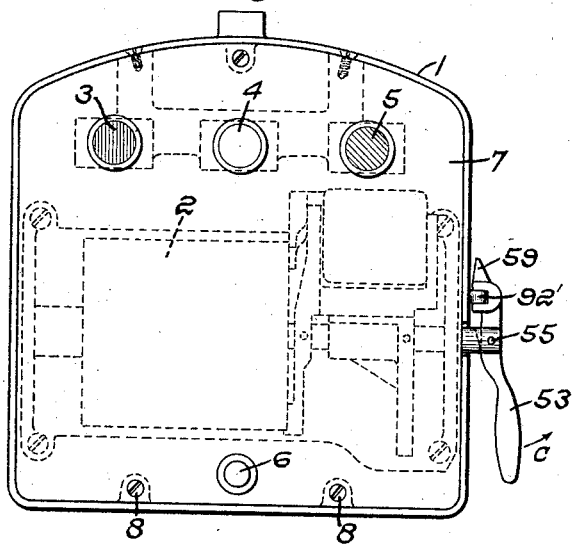
Fig. 1 is a front elevation of the controller.
Figure 2:
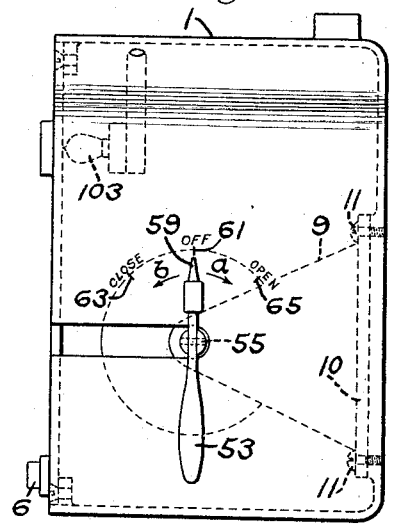
Fig. 2 is a right hand side elevation of the same.
Figure 3:
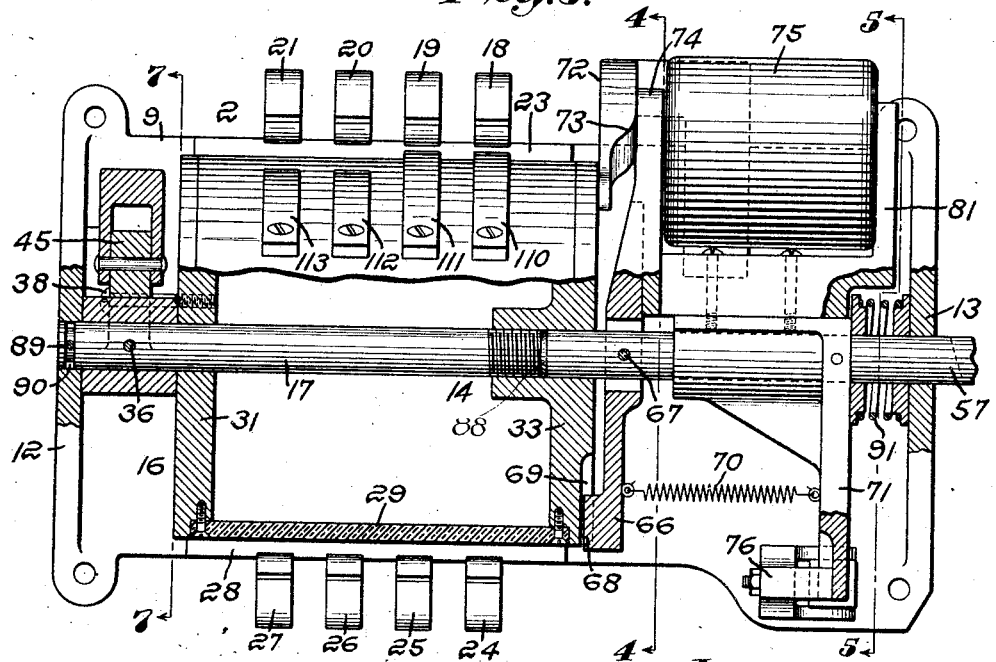
Fig. 3 is a detail elevation partly in section of the switch members and actuator means therefor.
Figure 9:
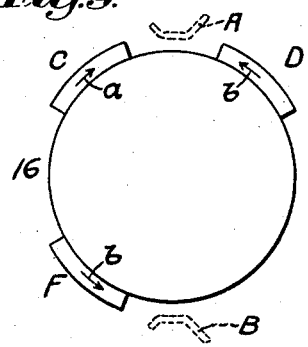
Figure 10:
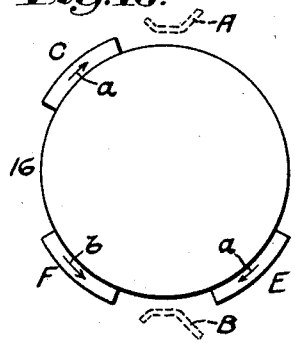
Figure 11:
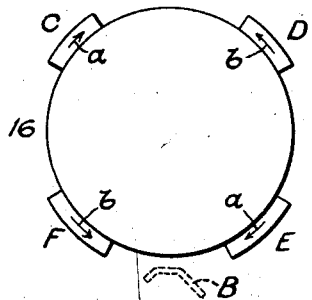
Figure 12:
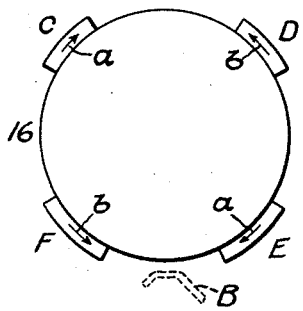

In the drawings, referring particularly to Figs. 1 to 3 inclusive, a casing 1 is provided for containing a switch mechanism 2 together with indicators, such for example as red, white and green lights 3, 4 and 5 respectively, for indicating certain stages or conditions in the operation of the motor. For example, when the motor is used for operating a valve as in the said copending application, the red light 3 may be employed to indicate when such valve has reached its closed position. The white light 4 is desirably used to indicate when the motor is running either to open or close the valve or even if it stops before completing either its opening or closing movement, and the green light 5 herein represents the limit of the opening movement or when the valve has reached its full open position.

Also contained in said casing is provided means desirably so connected in the electric circuit or circuits for controlling the motor that upon operation of said means the motor may be stopped at any stage of its operation either from proximate or remote points, as will hereinafter more fully be described.

Desirably the several indicators 3, 4 and 5 are visible through a removable cover plate 7 arranged to be held in place by screws 8 although it is to be understood that the invention is not limited to the design of the casing shown nor to the arrangement and specific manner of securing the cover to said casing herein shown.

The switch mechanism 2 desirably embodies a bracket 9, mounted within the casing 1 and upon which the switch elements and actuators are mounted. This bracket is shown as having a base 10 secured by screws 11 to the rear wall of the casing 1, and projecting from said base are bearing members 12 and 13 constituting bearings for a two-part shaft 14. The switch further desirably includes relatively fixed and movable switch members provided with actuator means for effecting relative movement therebetween to close the motor circuit and to hold the same closed while certain conditions continue to exist, as will be more fully hereinafter explained. But when the need for maintaining the said circuit closed ceases, means herein provided are caused to function to release and to return said movable member to its open circuit or normal position.

In the present example the relatively fixed switch member consists of two series A and B of resilient contact blades, the series A consisting herein of four blades marked 18, 19, 20 and 21 secured by screws 22 to a part 23 carried by the bracket 9. The other series B is also shown as comprising four blades represented by the numerals 24, 25, 26 and 27 respectively, which are desirably arranged in opposed relation to the aforesaid series A, and in turn are secured to a member 28 also carried by the bracket 9.

The movable member of the switch herein represented by the numeral 16 is desirably cylindrical in form and rotatably mounted between and engageable with the two series of fixed switch members 18 to 21 and 24 to 27 respectively, to rotate in the bracket 9.

Secured upon the outer periphery of the cylindrical movable switch member 16 are contact plates for cooperating with the said fixed switch member blades, the peripheral portion of said switch member being composed of suitable non-conducting material such for example as bakelite, as represented by the numeral 29, Fig. 3, to insulate the said plates from each other. Desirably the insulated portion 29 is hollow and secured to discs 31 and 33, both of which are mounted upon a section 17 of the shaft 14.

Obviously the switch mechanism herein disclosed may be used in connection with a motor arranged to rotate in only one direction or, as herein shown, with a motor capable of forward and reverse movements, but when the latter form of motor is used it is desirable to provide two series of contacts upon said rotary switch member for cooperating with each fixed series of switch blades A and B. For example, assuming that the rotary or movable switch member 16 is in its normal neutral position, as indicated in the several figures of the drawings, C and D represent two series of contacts which are disposed upon the periphery of the member 16 substantially equi-distant from the series or fixed contacts A (see Fig. 9) but spaced far enough from said series A to prevent the jumping across of an electric current from either the contact C or the contacts D, and likewise upon the opposite sides of the member 16 two series of contacts E and F (see particularly Fig. 10) are equally spaced upon opposite sides of the fixed contacts B, whereupon movement of said rotary member about its axis in one direction, for example in the direction of the arrows a, will cause the series of contacts C and E to engage respectively with the fixed blades A and B.

On the other hand, if the member 16 is rocked in an opposite direction, that is in the direction of the arrows b, the contacts D and F will be brought into engagement with the fixed blades A and B respectively with the result that the direction of movement of the motor will be reversed, as will hereinafter be more fully explained.

In order that the construction of the device may be more readily understood, let it be assumed that the movement of the rotary switch member 16 from the position shown is to be in the direction of the arrows a so as to bring the series of contacts C and E into engagement respectively with the series of fixed contacts A and B. The motor, which we shall assume is controlled by said switches, will be operated in a forward direction, and if used to operate a valve the valve will for example be opened. On the other hand, a reverse movement of said member 16, or in the direction indicated by the arrow b, will bring the contacts D and F respectively into engagement with the fixed switch members A and B and operate the motor in a reverse direction to close a valve.

For the purpose of maintaining the movable switch member 16 in its neutral or open circuit position I provide a cam member 35 having arms 37 and 39 angularly disposed with relation to each other to form a cam track 41 having its lowest point 43 substantially midway between the extremities of said arms. The member 35 is desirably secured to the section 17 of the shaft 14, by a pin 36, and to the rotary member 16 by screws 38, herein extending through the arms 37 and 39, into engagement with the end disc 31 of said rotary member, whereby said shaft, cam and rotary member will move or rock about the axis of the shaft 14 as a unit.

A follower 45 is arranged to roll upon the cam track 41 and to swing in a radial direction with respect to the axis of the cam 35 about the axis of a pivotal stud 47 carrying a rocker arm 49 upon which said follower 45 is mounted. A spring 51 secured to the outer end of the carrier arm 49 and to a fixed part of the casing 1 yieldingly maintains the cam follower 45 in contact with said cam 35 and tends normally to return said follower to the lowest point 43 of the track.

It will be apparent from the foregoing description that when the movable switch member 16 is rotated in one direction or the other the cam surfaces of the arms 37 and 39 will cause the cam follower to move outwardly from the axis of the shaft 14 against the action of the spring 51 and constantly exert pressure upon one or the other of said arms according to the direction of rotation, to return said switch member to its normal neutral position.

To actuate the movable switch member I preferably provide an operating handle 53 herein shown pivotally connected at 55 to the end of a section 57 of the shaft 14. The portion of the shaft section 57 to which the actuator arm 53 it attached, desirably protrudes through the outer wall of the casing 1 at a point near the bearing 13 of the bracket 9 within which said shaft section 57 is journalled to rotate. The inner end of said shaft section projects into the end disc 33 of the movable switch member 16 and is free both to turn and reciprocate therein, although it forms a support for that end of said movable switch member.

The actuator lever 53 is provided with a pointer 59 which is arranged to cooperate with markings on the adjacent wall of the casing 1 to indicate the several positions of the actuator lever and also the movable switch member 16. In the present instance, particularly where the device is adapted to be used in connection with valves as described in the aforementioned copending application, I provide a mark 61 designated "Off" which represents the neutral position of said movable switch member. A second mark 63 designates the position of the movable switch member when the motor is operating to close the valve, hence this mark is characterized by the word "close". A third mark 65 indicates the position of the pointer 59 and likewise the movable switch member when the motor is operating to open the valve or operate in a forward direction, and this mark is characterized by the word "Open".

The actuator 53 for said movable switch member is desirably so arranged that it may be operatively connected with and disconnected from the movable switch member 16, herein by means including a latch 66 pivoted at 67 to the shaft 57 to which said actuator is attached. The latch 66 is arranged to span said shaft to which it is pivotally connected by a pin 67 extending transversely through the shaft spanning part of said latch and the immediate part of the shaft 57. This connection insures the unitary rotation of the latch and shaft but allows a limited longitudinal swinging of said latch relatively to the shaft. One end of the latch 66 is provided with a tongue 68 arranged for engagement within a groove 69 in the rotary member 16, whereby rotary movement of said shaft 57 will be transmitted through the said operative connection to the switch member 16. Therefore if said actuator lever is moved to its "open" position the switch member 16 will be moved to a corresponding position and close the circuit for operating the motor to open the valve, but should said lever 53 be moved to the "close" position said switch 16 will likewise be moved to close the circuit to the motor which will effect the reverse operation of said motor or close the valve.

Actuation of the latch 66 to disconnect its tongue 68 from the groove 69 of the switch member 16 and allow the latter to return to its "off" position when the motor has reached the limit of its forward movement, or when the driven device, herein the valve, has seated or engaged an obstruction in its closing operation, is herein effected by a spring 70 connected at one end to the latch 66 and at the other end to a relatively fixed part 71, and this spring tends continually to withdraw the tongue 68 of said latch from the groove 69.

To insure the normal engagement of the latch 66 with said member 16 a cam 72 is provided, said cam being herein substantially segmental in shape and having a raised portion 73 for engaging the end 74 of the latch member 66 (see Figs. 3, 4 and 5). The segmental cam 72 is herein rigidly secured upon the base 10 of the bracket 9 with its cam surface 73 so positioned that when the members 16 and 66 are in neutral or "off" position they will be in the interlocked or operatively connected relation shown in Fig. 3. The high part 73 of the cam 72 extends for a portion only of the angle of movement of the arm 74 of said latch member either side of said "off" position, so that when said arm 74 travels far enough to ride off of said cam portion the spring 70 will act to disconnect the latch member from the movable switch member and permit the cam 35 and its spring actuated follower to return the movable switch member to neutral position.

To supplement the cam 72 for the purpose of maintaining the switch member 16 in one or the other of its closed positions until some condition arises that necessitates the opening of the switch and stopping of the motor, electromagnetic means are employed, herein consisting of a magnetic coil 75 acting upon the end 74 of said latch member so as to attract said latch member when said coil is energized, thus acting in opposition to the spring 70 to maintain the tongue 68 within the groove 69. Desirably the circuit including said magnetic coil 75 is adapted to be closed at one extreme or the other of its movement approximately at the same time the forward and reversing motor circuits are closed and to open approximately as said motor circuits are opened, so that when the motor is running in one direction or the other said magnetic coil 75 will be energized to maintain the operative connections between the movable switch member and its actuating lever 53 through the latch 66.

Where a motor is to be operated over an extended period of time either forwardly or reversely, it is desirable to provide means for holding the movable switch member in either the "open" or "close" position or until some condition arises which necessitates the immediate release thereof. To this end a detent 76 pivotally mounted at 77 upon a portion of the bracket 9 has a tongue 78 which engages opposite edges 79 and 80 of a segmentally shaped member, herein the part 71, to which the spring 70 is attached, and to respectively hold said member in positions corresponding to the "open" or "close" positions of the actuator arm 53. The lever 71 is secured to rotate with the shaft 57 and carries a bracket 81 for supporting the magnet 75. In addition to engaging the opposite sides 79 and 80 of the lever 71 the tongue 78 of said detent 76 is arranged to engage with a recess 82 substantially central of the segmental member 71 to maintain said member in a position coinciding with the neutral or "off" position of the actuator arm 53, thus insuring the registering of the tongue 68 with the groove 69 when said parts come to rest in their normal positions. A spring 83 yieldingly retains the detent 76 in engagement with the segmental lever 71 except as hereinafter described. An adjustable stop screw 84 is provided to limit the movement of the detent: For example when the tongue 78 thereof drops off the side adjacent the surface 79 or adjacent the surface 80. Stop pins 85 and 86, herein carried by part of the bracket 9 (see Figs. 5 and 6) are provided respectively to engage the sides 79 and 80 of the segmental lever 71 and prevent excess swinging movements of the arm 53 insuring the alignment of the contact plates on said member 16 with the relatively fixed switch members A and B.

With the foregoing arrangement, assuming that the motor is to operate for a predetermined length of time in its forward direction, the actuator lever 53 is manually rocked upon its pivot corresponding to the axis of the shaft 57, from the position marked "Off" until the pointer 59 registers with the mark 65 (see Fig. 2), and because the tongue 68 of the latch is being held in interlocking engagement with the recess 69 by the cam 72 the movable switch member 16 will be moved to bring the series of contact plates C into contact with the series of relatively fixed switch members A. Also the series of contacts E will be moved to engage the fixed contacts B thereby completing the motor circuit and the circuit including the magnet 75, the latter supplementing the cam 72 to retain the tooth 68 within the notch 69, after the lever 74 rides off of said cam.

The parts of the switch and actuator continue to remain in the aforesaid positions until a predetermined stage in the operation of the motor is reached, when other instrumentalities are functioned to open the circuit including the electro-magnet 75 and incidentally the circuit including the motor. Upon the opening of said magnetic circuits the armature 74 of the magnet 75 is released, permitting the spring 70 to withdraw the tongue 68 from the groove 69 in the movable switch member, following which the spring 51 acts through the follower 45 and cam surface 41 to return the switch member 16 to its normal neutral position. But owing to the detent 76, the tongue 78 whereof is against the surface 80 of the segmental lever 71, the actuator 53 and latch 66 will still remain in its "open" position and continue to indicate in which direction the motor has recently operated, thereby preventing further operation of the motor in the same direction, at least until said actuating handle has been returned to its neutral or "off" position.

Before the switch member 16 can again be operated the actuator 53 must be returned to its "off" or starting position so that the latch 66 will operatively connect with said switch. To do this it will first be necessary to release the lever 71 from the detent 76, and in the present example this is accomplished by moving the shaft 57 longitudinally to the right of Fig. 3 for the purpose of withdrawing the segmental lever 71 from engagement with the tongue 78 of said detent 76, which latter is prevented from following by the adjusting screw 84 engaging an abutment 87 herein forming a part of the support for said detent. Normally the shaft 57 is yieldingly held in its extreme left position, as viewed in said Fig. 3, with the inner end thereof abutting the end of the other section 17 at 88, said latter shaft being prevented from longitudinal movement by a screw 89 carried by the arm 12 of the bracket 9 and extending into an annular groove 90 formed in said shaft 17. A spring 91 interposed between the arm 71 and the adjacent bearing member 13 of the bracket 9 normally yieldingly retains said shaft 57 in the position shown in said Fig. 3.

In the present example longitudinal movement of the shaft 57 toward the right is effected by the lever 53 which has a rolling fulcrum 92' constantly engaging the outer wall of the side of the casing 1 and permitting free rotary movement of said actuating lever for moving the movable switch member from one angular position to the other.

By swinging the handle of the actuator lever 53 to the right in the direction of the arrow c, Fig. 1, and about the axis of the pivot pin 55, said pin will move outwardly about the roller 92' as an axis and move with it the shaft 57 sufficiently to disconnect the segmental arm 71 from the tongue 78 of the detent 76. As soon as the arm 71 is freed from the detent 76 the actuating arm 53 may be moved to its "off" position where the tongue 68 will again register with the groove 69 and effect reconnection of said actuator with the movable switch member by the spring 91. Following this reconnection the actuating lever 53 may be moved either to the right or left according to the direction of movement required of the motor.

In the present embodiment of the invention, as in the said copending application, the means for opening the motor circuits and electro-magnet circuits may be operated either manually or automatically.

To operate manually I herein provide a push button 6 in some convenient location such as in the cover of said casing, which, upon being pressed, opens the electric circuit including the magnet 75. This deenergizes the magnet 75 whereupon the armature 74 is released, allowing the spring 70 to withdraw the latch 66 from the switch 16. The spring 51 then moves the cam follower 45 to the lowest point 41 of the cam 35, which action returns the switch member 16 to neutral or "off" position, thereby stopping the motor. Obviously one or more switches may be included within the circuit of said magnet 75 so that said circuit may be opened either from near or more remote points, and in this connection I have shown two other push buttons 30 and 32 (see Fig. 13), although it is to be understood that the invention is not limited to the type of switches nor to the arrangement and location shown.

The means for automatically breaking the said motor circuits may vary according to the type of member to be driven by the motor, but for example, in Fig. 13 I have illustrated in diagrammatic form a limit switch 91' comprising a movable member 92 driven at the proper rate of speed, herein by a screw 93 operated in any appropriate manner from the driven member, such as the valve of the copending application previously mentioned. Relatively stationary contacts 94 and 95, included in the circuit with the motor and said magnet 75 as hereinafter described, are engaged by the movable member 92 while the motor is in operation but when said member 92 is disengaged from said stationary contacts 94 and 95, as shown in full lines in Fig. 13, the electric circuit including said switch will be broken and the latch 66 released with the result previously described. Let it be assumed that the limit switch 91' controls the opening of a valve such as described in said copending application and is set to break the motor circuit when the valve reaches its full open position, and that closing operations of said valve are preferably controlled by a centrifugal switch 96 similar, it may be, to the centrifugal switch of said copending application. This centrifugal switch includes a pair of spaced contacts 97 and 98 connected in circuit with the motor, feed line and switch 2. One or more, herein two, contact members 99 and 100 are arranged to be moved under predetermined speed of the driven member to engage said spaced contacts 97 and 98 and cause electricity to pass from one of the latter to the other. When the speed of rotation of the driven member is reduced below said predetermined point because of said driven member meeting an obstruction or if a valve, the seating of the same, then the contacts 99 and 100 will move to the postion shown in Fig. 13 and break the motor circuit.

It has previously been stated that indicators are employed for indicating when the motor is running, and when it has reached certain limits in its forward and reverse movements, and that these indicators embody red, white and green lights 3, 4 and 5 respectively. Desirably these lights are in the form of colored windows or lenses tightly secured in the cover 7 of the casing 1 to exclude moisture from said casing, and arranged within said casing and directly in back of said windows and co-operating therewith are electric lamps 101, 102 and 103 which in addition to being under control of the switch 2 are lighted at the proper times by switches that are closed automatically when it is desired that said lights shall be visible.

To this end I provide a switch 104 including relatively movable members 105 and 106 respectively arranged to be brought into contact by any appropriate means, not shown, to close the circuit of the lamp 101 behind the red lens 3 when one selected limit of the motor is reached. A second switch 107 including relatively movable contacts 108 and 109 respectively arranged when brought together by any appropriate means, not shown, to close the circuit of the lamp 103 behind the green lens 5 and indicate when the motor reaches another selected stage in its operation. The remaining lamp 102 is desirably connected in the motor circuit so that whenever the motor is running said white lens 4 will be illuminated. It is however to be understood that the invention is not limited to the particular arrangement and number of indicators shown.

The contacts composing the series C, D, E and F of the movable switch member 16 are obviously susceptible of numerous arrangements consistent with the number of elements to be controlled thereby, but herein the series C consists of contacts 110, 111, 112 and 113.

The series D comprises contacts 114, 115 and 116. The series E includes contacts 117, 118 and 119 and the series F comprises contacts 120, 121, 122 and 123.

By referring to Fig. 13 it will be seen that the contacts 110 and 111 are electrically connected together and arranged to be moved in the direction of the arrow $a$ into contact with the relatively fixed blades 18 and 19 respectively so as to send the current from one of the latter to the other.

The blade 18 is here shown as being electrically connected by conductor 124 with the magnet 75 which in turn is connected through conductor 125 with a line or feed wire $L^1$ for the motor herein shown conventionally at 127. A conductor 128 provides communication desirably through the limit switch 91 with a second line or feed wire $L^2$. Therefore when the limit switch is closed, as shown dotted in Fig. 13, which will be the case if the motor has not reached the limit of its movement corresponding to the valve opening operation of said copending application, the movement of the contacts 110 and 111 respectively into engagement with the blades 18 and 19 will result in the energizing of the magnet 75 and the attraction of the armature 74, which alone holds the actuator 53 in operative connection with the movable switch member 16, and in oposition to the spring 70, after said armature has passed beyond the range of the cam 72.

The contacts 112 and 113, which move with said contacts 110 and 111, are electrically connected together as shown in said figure so that as these contacts move into engagement with the blades 20 and 21 current will pass from one of the latter to the other.

In the example herein illustrated a compound direct current motor is employed although it is to be understood that the invention is not limited to this type of motor. This motor includes shunt field windings 130, series field windings 131 and armature brushes 132, and for convenience each of the above has two terminals arranged in a junction box 133 indicated in dotted lines in Fig. 13. Desirably the shunt field terminals are marked $F^1$ and $F^2$, the series field terminals $S^1$ and $S^2$ and the armature terminals $A^1$ and $A^2$.

Leading from the switch member 20 is a conductor 134, herein connected with the terminal $A^2$ of the motor armature circuit. The switch member 21 is desirably connected by wire or other conductor 135, herein with the terminal $S^2$ of the series field windings 131. Simultaneously with the movement of the series of contacts C, the series E, which herein includes only three contacts 117, 118 and 119, moves into contact with the relatively stationary series of blades B in the following order: The contact 117, which herein is connected with the other two members 118 and 119 by a wire 136, moves to the member 25 of the series B, herein connected by wire 137 with the terminal $F^2$ of the shunt field windings 130. The contact 118 likewise moves to engage the blade 26, herein directly connected with the line wire $L^1$, while the contact 119 moves to the blade 27 having a wire 126 leading to the terminal $A^1$ of the armature circuit 132.

Upon completion of the movement of the switch 16 in the direction of the arrow $a$ the electro-magnet circuit will be completed together with the motor circuit for operating the latter, we will say, in a forward direction, or if connected with the valve aforesaid, in a valve opening direction. This action continues until the movable member 92 of the limit switch 91 is disengaged from the stationary contacts 94 and 95 as shown in full lines, Fig. 13, whereupon the circuit through contacts 110, 111 and magnet 75 will be broken and the armature 74 released. The releasing of the said armature 74 results as hereinbefore described to effect the release of the switch member 16 and its return to neutral or "off" position, leaving the actuator handle pointer 59 registering with the "open" mark 65.

Simultaneously with the final circuit breaking movement of the limit switch member 92, the switch member 109 is desirably moved to engage the contacts 108 and thereby close the circuit including line wire $L^2$, a conductor 139, the lamp 103 back of the green lens 5, conductor 140 and line wire $L^1$. As a result of this the green light will be visible to indicate to an observer that said motor has completed its forward or valve opening movement, and the valve is now open.

Immediately prior to the movement of said limit switch member 92 to its circuit breaking position the circuit including the running light 102 behind the white lens 4 was closed, it having been closed the moment the motor circuit including the centrifugal switch members 97, 98 and one or both contacts 99 and 100 was closed by reason of said motor having acquired centrifugal force sufficient to move the contacts 99 and 100 into engagement with the rings 97 and 98 as may be more clearly understood by referring to said copending application.

The arrangement of circuit for effecting the illumination of said running light as just described preferably includes the main feed wire $L^1$ together with wires 140 and 141 leading to the lamp 102. A conductor 142 provides connection with one of the rings, herein the ring 98, of said centrifugal switch, while a conductor 143 connects the other ring 97 of said centrifugal switch with the main feed wire $L^2$. This circuit being under the control of said centrifugal switch, it will be apparent that when the motor, which operates said centrifugal switch stops, as it will when the limit switch 91 is opened as hereinbefore stated, said running light 102 will immediately be extinguished.

To again operate the motor, the actuator lever 53 must first be returned from its "open" position (see Fig. 2), where it is left following the breaking of the motor circuit in the previous operation, to its "off" or neutral position, in order to again be operatively connected with the movable switch member 16 by the means hereinbefore described.

It is now apparent that any further movement of the actuator lever 53 to the "open" position of Fig. 2 will not result in any further forward movement of the motor owing to the fact that the limit switch 91 is still broken and the magnet 75 still deenergized so that the moment the armature 74 leaves the cam 72 the spring 70 will act to again disconnect the actuator means from the switch member 16 and allow the latter to return to its "off" position.

Any movement, however, of the actuator 53 toward the "close" position of said switch member 16, that is in the direction of the arrows $b$ in Figs. 2, 6 and 13, will result in the energizing of the magnet 75 although neither the circuit of the limit switch 91 nor that including the centrifugal switch is closed, but the cam surface 73 is extended farther in this direction than in the reverse direction so as to insure the engagement of the motor circuit closing contacts of the series D and F engaging the contact plates of the series A and B before the armature 74 leaves said cam. This necessitates a somewhat slower movement of the lever 53 in this direction in order to give the motor time to acquire sufficient momentum to close the centrifugal members 99 and 100 against the rings 97 and 98. When this switch is closed the lever 53 may be moved to its fully reversed position so as to free the armature 74 from the cam 73 in order that it may be free to close when the centrifugal switch members 99 and 100 are later released from the rings 97 and 98 by slowing down or stopping of the driven part of said centrifugal switch.

The series D and F of contacts for the member 16 which are brought into action when the switch is moved in the direction of the arrow $b$ are so connected with the motor and other devices that said motor will operate in a reverse direction to that in which it was previously operated, the running light will again be lighted and when the reverse operation is completed said running light will be extinguished and the "close" light illuminated.

To this end the contact 114, which engages the plate 18, is electrically connected by conductor 144 with the contact 120 which in turn engages the plate 24. This plate is connected through conductor 142 both with the running light 102 and the member 98 of the centrifugal switch. The other ring 97 has connection through the conductor 143 with the line wire $L^2$, while another conductor 145 extends to the terminal $F^1$ of the shunt field windings 130 and also to the terminal $S^1$ of the series field windings 131.

The running light 102 has connections through conductors 141 and 140 to the other line wire $L^1$, thus completing the circuit which when the centrifugal switch closes, illuminates the running or white light.

The limit switch 91' is not used in the reverse direction hence no contact is provided in the series D to cooperate with the contact plate 19 from which leads the conductor 128 to the member 95 of said limit switch.

The contact 115 of said series D is connected through a conductor 146 with two contacts 121 and 122 of the series F and when these contacts engage respectively plates 20, 25 and 26 of the series A and B an electric circuit will be completed from the plate 26 to the line wire $L^1$, from the plate 20 through conductor 134 to the motor terminal $A^2$ and its windings thence through the conductor 126 to the plate 27 and contact 123 engaging therewith. The contact 123 is connected through a conductor 147 with the contact 116, herein engaging the plate 21, the latter, as previously described, being connected by wire 135 with the terminal $S^2$ of the series field windings 131 of the motor, and the terminal $S^1$ of the latter is connected as previously stated with said centrifugal switch.

The engagement of the contact 121 with the plate 25 also completes a circuit along the conductor 137, motor terminal $F^2$ of the shunt field windings 130 and also to said centrifugal switch.

As long as the circuits just described remain closed the motor will continue to run in the direction stated until the circuit through the said centrifugal switch is interrupted, or one of the push buttons 6, 32 or 30 is pressed, in any one of which events the magnet 75 will be deenergized and the motor stopped by the return to neutral position of the switch member 16.

Should the motor be stopped before it has fully completed its operation it will be possible, upon the removal of the cause for stopping to continue the operation in the same direction by releasing the actuator 53 and bringing it back to neutral position for interconnection with the switch member 16. Following this the motor will continue in reverse until the same is completed, whereupon the centrifugal switch blades 99 and 100 withdraw from the rings 97 and 98 breaking the magnet circuit, and the switch member 106 (see Fig. 13) engages the contacts 105 to close the circuit including the light 101 at the rear of the red lens 3.

It will be observed that the contacts 114, 110, 111, 120, 121 and 117, which have more or less to do with the closing of the magnet circuit, are placed somewhat nearer to the plates of the relatively fixed switch members with which they coact than are the remaining contacts of the movable switch members 16, which latter control the motor circuits. This arrangement of said contacts is made for the purpose of effecting the closing of the magnet circuits slightly in advance of the motor circuits so that in case the operator lets go of the actuator handle 53 the moment the motor is operating the said magnet will be effective to retain the motor circuits closed if all other conditions for the operation of said motor are right.

Although I have disclosed in detail one full and complete embodiment of my invention, it is to be understood that the invention is not limited thereto.

Claims:

1. In a device of the character described, relatively stationary and movable switch members, manual actuating means for the movable switch member, electro-magnetic means for maintaining operative connection between said movable switch member and said actuating means and means to hold said actuating means in several positions.

2. In a device of the character described, a stationary switch member, a rotary switch member, an actuator for the rotary switch member, means yieldingly to hold said rotary switch member in a plurality of circuit closed positions and means cooperating with said actuator to hold said rotary switch member in circuit open position.

3. In combination, relatively stationary and movable switch members, one of said switch members having two sets of contacts respectively to cooperate with the other switch member to close a plurality of circuits, means yieldingly normally to maintain said movable switch member in neutral position, actuator means for actuating said movable switch member to close one or the other circuits and electro-magnetic means operable while one or the other of said circuits is closed to maintain operative connection between said switch member and its actuator.

4. In combination, relatively stationary and movable switch members, one of said switch members having plural series of contacts, said series of contacts being arranged respectively for engagement with the other switch member to effect the closing of a selected circuit, an actuator for said movable switch member, means for operatively connecting said actuator with said movable switch member including a cam actuated latch and electro-magnetic means for supplementing the action of said cam upon the closing of said circuit to maintain said actuator and movable switch member operatively connected together.

5. In a device of the character described, a switch having fixed and movable members, means yieldingly to hold said movable switch member in neutral position, an actuator for moving said movable switch member to circuit closing position, mechanical means to effect initial operative connection between said movable switch member and said actuator and electrical means to supplement said mechanical means in maintaining said operative connection between the switch member and its actuator.

6. In a device of the character described, a switch having fixed and movable members, means yieldingly to hold said movable switch member in neutral position, an actuator for moving said movable switch member to circuit closing position, mechanical means to effect initial operative connection between said movable switch member and said actuator and electro-magnetic means to supplement said mechanical means in maintaining said operative connection between the switch member and actuator.

7. In a device of the character described, a self-opening switch, actuator means for said switch, releasable means for operatively connecting said switch and said actuator, means for holding said releasable means in connecting relation for at least a portion of the movement of said actuator, and means dependent upon the closed condition of the motor circuit for supplementing the aforesaid holding means in maintaining said switch and actuator operatively connected.

8. In combination, a plurality of circuits, a switch, actuating means for moving said switch to effect closing of a selected one of said circuits, means effective upon the breaking of any of said circuits for disconnecting said actuating means from said switch, and means to retain said actuator means in its last position irrespective of the position of said switch.

9. In combination, at least two electric circuits, self-opening switch means for effecting the opening of one or the other of said circuits, actuator means for moving said switch to one or the other circuit closing positions, releasable means for maintaining operative connection between said switch and said actuator means at least when a circuit is closed and means for holding the actuator means in its present position regardless of the position of said switch.

10. A switch, normally connected actuator means for closing said switch, releasable means operatively connecting said switch and said actuator means arranged to be released upon the interruption of current through said switch and means to hold said actuator means in its circuit open or closed position regardless of the position of said switch.

11. A switch, a disconnectible actuator for said switch, electro-magnetic means for holding said actuator connected with said switch, self-opening means for said switch and means controlled by said switch for closing the circuit of said electro-magnet in advance of the switch circuit.

12. In a device of the character described a cylindrical switch member, at least two series of contacts carried by said cylindrical switch member, a series of relatively stationary contacts to cooperate with each of the series of contacts carried by said cylindrical switch member, means to actuate said cylindrical switch member in opposite directions to close the circuits including one or the other of said relatively stationary series of contacts, latch means for effecting simultaneous movement of said cylindrical switch member and the actuating means therefor and cam means to maintain said latch in operative connection with said cylindrical switch member during selected portions of the oscillation thereof.

13. In a device of the character described a cylindrical switch member, at least two series of contacts carried by said cylindrical switch member, a series of relatively stationary contacts to cooperate with each of the series of contacts carried by said cylindrical switch member, means to actuate said cylindrical switch member in opposite directions to close the circuits including one or the other of said relatively stationary series of contacts, latch means for effecting simultaneous movement of said cylindrical switch member and the actuating means therefor, cam means to maintain said latch in operative connection with said cylindrical switch member during selected portions of the oscillation thereof, and electro-magnetic means for supplementing said cam means in maintaining said operative connection between said cylindrical switch member and its actuating means.

14. In a device of the character described, a switch having fixed and movable members, means tending to return and hold said movable switch member in neutral position, an actuator for moving said movable switch member to circuit closing position, mechanical means to effect initial operative connection between said movable switch member and said actuator and electrical means to supplement said mechanical means in maintaining said operative connection between the switch member and its actuator.

15. A switch mechanism comprising two series of fixed contacts, a movable switch member carrying contacts for respectively cooperating with said two series of fixed contacts, an actuator member for said movable switch member, means for releasably holding said movable switch member with its contacts in engagement with the contacts of one or the other of said two series of fixed contacts, and adapted upon the breaking of either of said circuits to release and return the movable switch member to neutral position independently of said actuator member.

In testimony whereof, I have signed my name to this specification.

CHARLES R. KELTY.